March 15, 1927.
P. MacKENZIE
1,621,172
GREASE GUN
Filed March 14, 1923
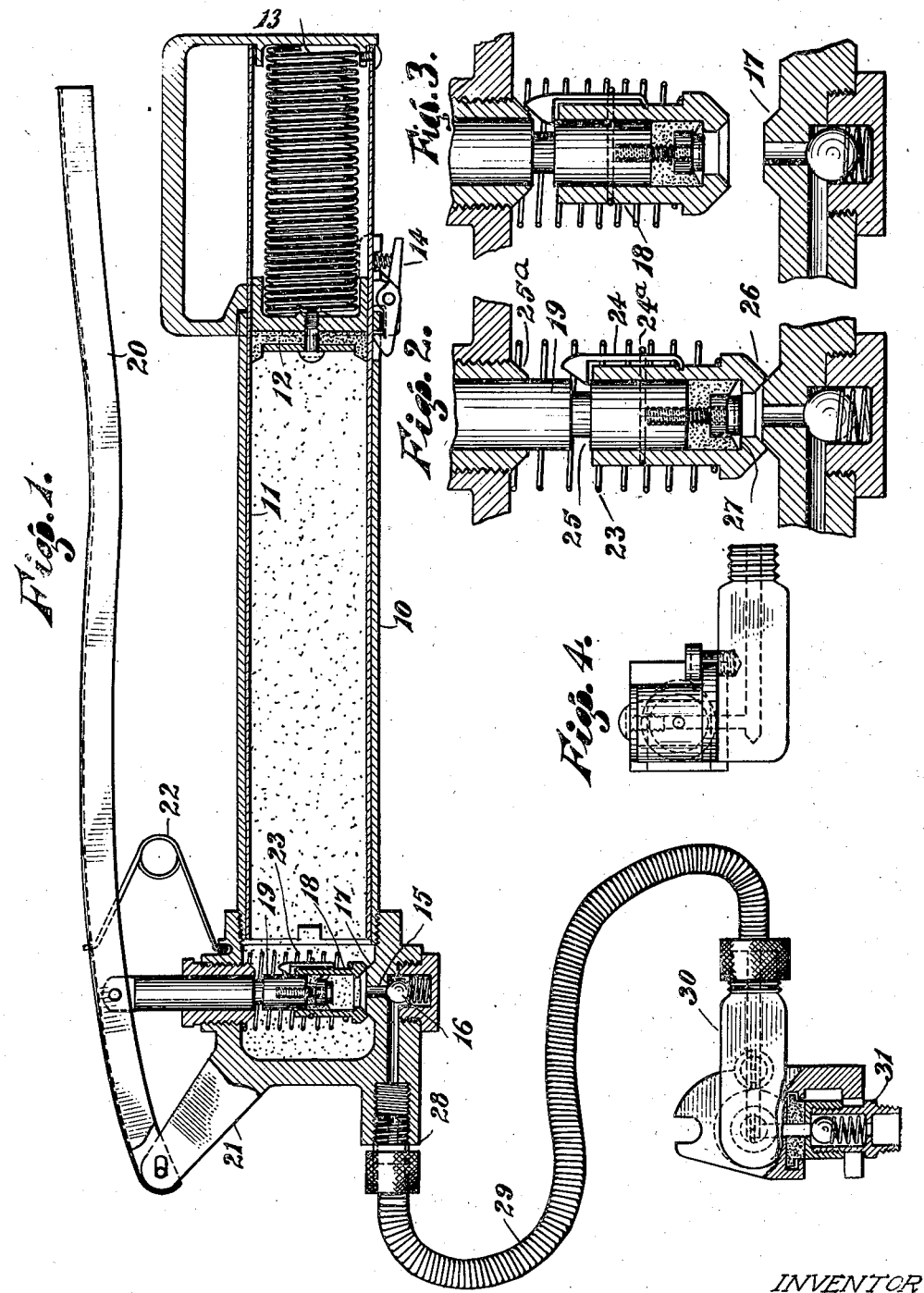
INVENTOR
PHILIP MacKENZIE.
BY Dewey Strong,
Townsend & Loftus.
ATTORNEYS.

Patented Mar. 15, 1927.

1,621,172

UNITED STATES PATENT OFFICE.

PHILIP MacKENZIE, OF SAN FRANCISCO, CALIFORNIA.

GREASE GUN.

Application filed March 14, 1923. Serial No. 624,912.

This invention relates to grease guns, and has for its object to obtain higher pressures than have been obtained by guns heretofore used, and also to reduce the effort required to operate the gun. A further object is to discharge increased quantities of grease at each actuation of a lever or handle.

In carrying out this object I employ a reservoir or container with means to force the grease towards one end thereof in which end there is arranged a movable sleeve cooperating with a valved outlet. Working within this sleeve is a plunger extending out through the reservoir and connected with an operating lever. When the plunger is depressed a spring latch on the sleeve grips the plunger so that both sleeve and plunger are raised in unison by the operating lever. Near the upper end of their movement the latch is released automatically and the sleeve is thereupon returned by its spring so that it traps a small quantity of grease above the discharge outlet. The lever is thereafter moved inwardly, depressing the plunger and forcing the entrapped grease out through the discharge valve or outlet.

The sleeve is held to its seat on the discharge valve not only by the force of this spring, but also by providing the sleeve with an inturned lip or flange at its lower end, which lip or flange will be subjected to downward pressure of the grease within the sleeve. The arrangement is such that an operating handle or lever of considerable leverage can be provided, and, inasmuch as the sleeve and its plunger are of relatively small diameters, the grease can be expelled with considerable pressure and without the application of any great amount of effort on the part of the operator.

One form which my invention may assume is exemplified in the following description and illustrated in the accompanying drawings, in which—

Fig. 1 shows a longitudinal central sectional view of a grease gun embodying my invention.

Fig. 2 shows a detail sectional view of the sleeve and the discharge outlet with which it co-operates, the sleeve being shown seated.

Fig. 3 shows a view similar to Fig. 2 with the sleeve in raised position.

Fig. 4 shows a detail of the connection between the flexible hose of the grease gun and the nipple or cup into which the grease is forced.

Referring in detail to the accompanying drawing, I show a reservoir or container 10 of comparatively large capacity and having a sleeve 11 fitted slidably into one end thereof. This sleeve carries a piston 12 behind which is a helical spring 13 tending to force the piston towards the opposite end of the reservoir. The sleeve 11 is held in the reservoir or container by a spring-pressed latch 14, or otherwise. The reservoir being filled with grease, the sleeve is inserted therein and the spring compressed so as to allow the piston to return to the outer end of the sleeve. When the sleeve has been fastened in place upon the reservoir the pressure of the spring 13 will tend to force the piston inwardly, thus keeping the opposite end of the reservoir well filled with grease.

In the end of the reservoir towards which the grease is moved I provide a discharge outlet 15 fitted with a check valve 16. Surrounding this discharge outlet is a conical or beveled seat 17 with which co-operates a reciprocating sleeve 18. This sleeve surrounds a plunger 19, which plunger extends out through the wall of the reservoir and connects with a hand-operated lever 20, the said lever being fastened at one end, as shown at 21, and extending parallel with the reservoir to the opposite end of the gun so as to afford ample leverage for easily operating the plunger.

This lever is normally held in raised position by a spring 22. The sleeve 18 is held against its seat by a spring 23, and fixed upon the said sleeve is a latch 24, having a spring 24ª to hold it in place and to yieldingly retain the end of the latch in engagement with the plunger. The latch has a hook which is adapted to enter a notch or groove 25 in the plunger when the latter is at its inner limit of movement, the said latch 24 being sufficiently strong to cause the sleeve to be lifted with the plunger against the pressure of the spring 23, both being lifted by the spring 22. When the plunger reaches its upper limit of movement the latch 24 engages a beveled surface 25ª on the wall of the reservoir, being released thereby so as to allow the sleeve to be returned under the influence of the spring 23. Preferably the lower end of the sleeve is beveled, as shown at 26, so as to decrease the resistance to its downward movement through the grease.

The sleeve, being thus seated, will have entrapped a quantity of grease overlying the discharge outlet and when the plunger is moved inwardly by the operating lever, this entrapped grease will be expelled through the discharge outlet. The plunger and sleeve being of small area and the operating lever affording considerable leverage, it is obvious that a great deal of pressure can be put upon the entrapped grease. In order to insure that the sleeve 18 shall not be lifted from its seat when pressure is applied to the entrapped grease, I provide the lower end of the sleeve with an inturned lip or flange 27, so that the grease being expelled by the plunger will press downwardly on this lip or flange and tend to retain the sleeve upon its seat. The area of this inturned flange or lip should be approximately equal to the area of that portion of the sleeve which contacts with the seat 17 so that the pressures in opposite directions will be balanced.

The discharge outlet 15 has a nozzle 28 to which is connected a flexible hose 29, the hose at its other end being provided with a suitable fitting 20 for attachment to a nipple 31 on the part to be greased.

The operation of the gun will be sufficiently clear from the foregoing. Among the advantages of the present device are the ease of operation, the ability of the device to exert extremely high pressures upon the grease being expelled and the fact that when the operating lever is in raised position the pressure is removed from the grease in the discharge line. In this connection it will be understood that in prior guns where screw fed pistons or plungers are employed, it is necessary to turn the piston or plunger backwardly so as to relieve the pressure on the grease before detaching the hose from its fitting. Therefore, by the use of the present device considerable time is saved in the greasing of a machine.

Having thus described my invention, what I claim and desire to secure by Letters Patent is:

1. A grease gun comprising a reservoir having a discharge outlet, a sleeve overlying the outlet and forming a seat therewith, a plunger in the sleeve, an operating lever arranged upon the exterior of the reservoir and connections between the operating lever and plunger and sleeve whereby the sleeve and plunger will be raised simultaneously by the lever, spring means to return the sleeve to its seat to entrap a quantity of grease, the plunger thereafter being depressed by the lever to expel the entrapped grease.

2. A grease gun comprising a reservoir having a discharge outlet, a sleeve overlying the outlet and having an inturned lip at the end adjacent the outlet, a seat for the sleeve surrounding the outlet, a spring for retaining the sleeve normally on the seat, a plunger in the sleeve, an operating lever arranged on the reservoir and connected with the plunger, a latch device between the sleeve and plunger to lift the sleeve when the plunger is raised, means for tripping the latch to allow the sleeve to return to its seat under the action of its spring, thereby entrapping a quantity of grease overlying the outlet, the plunger being thereafter depressed by the lever to expel the entrapped grease.

3. A grease gun comprising a reservoir, a piston therein, spring means acting against said piston to cause grease in the reservoir to be moved toward one end thereof, a discharge outlet at the last-named end of the reservoir, a reciprocable sleeve overlying the discharge outlet and forming a seat therewith, said sleeve acting upon reciprocation to entrap a quantity of grease overlying said outlet, a plunger working in said sleeve and capable of operation to expel the entrapped grease through said discharge outlet, a lever for operating said plunger, a spring for forcing said sleeve toward said discharge outlet, and automatically operating means for connecting said sleeve to said plunger at the end of each operating stroke of the plunger whereby the sleeve and plunger will be moved away from the discharge outlet in unison for a succeeding operation.

PHILIP MacKENZIE.